US006189307B1

(12) United States Patent
Buss et al.

(10) Patent No.: US 6,189,307 B1
(45) Date of Patent: Feb. 20, 2001

(54) FASTENER ASSEMBLY FOR ATTACHMENT OF COMPOSITE INSERT TO MOWER DECK

(75) Inventors: Steven Henry Buss, Horicon; Ronald Paul Holland, Fox Lake; Dean William Benter, Horicon, all of WI (US)

(73) Assignee: Deere & Company, Moline, IL (US)

( * ) Notice: Under 35 U.S.C. 154(b), the term of this patent shall be extended for 0 days.

(21) Appl. No.: 09/250,712

(22) Filed: Feb. 16, 1999

(51) Int. Cl.$^7$ ............................. A01D 67/00; A01D 34/00
(52) U.S. Cl. ......................................... 56/320.1; 56/6; 56/2
(58) Field of Search ...................... 56/16.7, 320.2, 56/320.1, 6, 17.5, 2; 411/399, 85, 84, 539

(56) References Cited

U.S. PATENT DOCUMENTS

| 3,531,923 | 10/1970 | DeLay ..................... 56/25.4 |
| 3,664,434 | * 5/1972 | Connor et al. ............... 172/536 |
| 4,306,409 | 12/1981 | Wulfers ..................... 56/320.2 |
| 4,936,884 | * 6/1990 | Campbell .................... 56/12.7 |
| 4,951,449 | 8/1990 | Thorud ....................... 56/2 |
| 5,090,183 | 2/1992 | Thorud et al. ................ 56/2 |
| 5,133,176 | 7/1992 | Baumann et al. .............. 56/17.4 |
| 5,191,756 | 3/1993 | Kuhn ......................... 56/17.5 |
| 5,205,112 | 4/1993 | Tillotson et al. ............. 56/2 |
| 5,210,998 | 5/1993 | Hojo et al. .................. 56/255 |
| 5,222,851 | * 6/1993 | Dickerson .................... 411/104 |
| 5,628,171 | 5/1997 | Stewart et al. ............... 56/320.2 |
| 5,628,599 | * 5/1997 | Eakin ........................ 411/163 |
| 5,638,668 | * 6/1997 | Kallevig et al. .............. 56/320.1 |
| 5,725,282 | * 3/1998 | Masseth, Jr. et al. .......... 299/39.3 |

FOREIGN PATENT DOCUMENTS 2028085   3/1980 (GB) ............................. A01D/35/26

OTHER PUBLICATIONS

Installation Instructions BM200008 for "42–Inch Convertible Mulching Kit", pp. 1–4, published by Deere & Company in the U.S.A. Feb. 3, 1999.

* cited by examiner

Primary Examiner—Robert E. Pezzuto
Assistant Examiner—Meredith C. Petravick

(57) ABSTRACT

A fastening assembly is adapted for attaching a composite insert to a mower deck. The insert has an opening extending therethrough and a recessed portion adjacent the opening. The recessed portion has a shoulder and a first abutment surface. The assembly includes a spacer receivable in the recessed portion adjacent the shoulder. The spacer has a passage therethrough alignable with the opening in the insert, the passage having a second abutment surface. The spacer also has an outer periphery, a portion of which forms a third abutment surface alignable with the first abutment surface for non-rotatable engagement therewith. The assembly also includes a fastening member which has a head and a shank. The shank includes a threaded portion and a further portion adjacent to the head. The further portion has a fourth abutment surface engagable with the second abutment surface whereby the fastening member is non-rotatably receivable within the spacer passage and the insert opening.

8 Claims, 3 Drawing Sheets

FASTENER ASSEMBLY FOR ATTACHMENT OF COMPOSITE INSERT TO MOWER DECK

BACKGROUND OF THE INVENTION

1. Field of the Invention

The present invention relates to mowers used for mulching vegetation such as grass as it is being mowed. More particularly, the invention relates to a fastener assembly for attaching a removable mulch insert to a mower deck for quickly and easily converting the mower deck between discharge/collection and mulching operation modes.

2. Description of Related Art

Conventional discharge/collection mowers typically include a mower housing or deck for enclosing one or more rotating cutter blades. Discharge outlets have been provided in these conventional housings for allowing grass clippings to be ejected from the housing. The outlet also allows air to be discharged from the housing, thereby allowing the rotating blade to create a vacuum effect that lifts the grass within the housing so that it can be cut properly and evenly. The clippings ejected from the discharge outlet are then blown on top of the mowed grass, or collected by use of a bagging attachment coupled to the discharge outlet.

Mulching mowers are also known which enclose the area of the mower housing where the discharge outlet would be located in a conventional mower. These mowers often include modifications to the underside of the housing such as deflector surfaces for deflecting the clippings forwardly, downwardly and/or inwardly toward the center support for the blade so that the clippings will be re-cut. The use of such a mulching mower is advantageous where it is desirable to mulch or chop the grass clippings into fine particles and direct these clippings downwardly into the growing grass. This allows the grass clippings to be hidden beneath the top surface of a lawn. In addition, this allows the grass clippings to decompose on the soil where they are of nutritional value to growing vegetation.

In order to accommodate operators who wish to mulch clippings under some conditions and collect or discharge clippings in other circumstances, mulch inserts have been developed for installation in mower housings otherwise set up for discharge or collection. An insert of this type may be secured to the underside of a mower housing to effectively block off discharge outlet and to change the effective shape of the housing so that a chamber for each cutting blade is created, the chamber made up of deflector surfaces for deflecting the clippings forwardly, downwardly and/or inwardly toward the center support for the blade so that the clippings will be re-cut.

Adaptations may be made to these mulch inserts so that they may be easily and quickly installed and removed so that an operator may discharge/collect or mulch clippings, as desired, without undue delay and effort. For instance, in order to prevent a requirement that a fastening assembly, such as a nut and bolt, be engaged simultaneously on top of and on the underside of the deck, a portion of the assembly may be fixed to the mulch insert against rotation and axial movement so that, once the insert is positioned properly, the attachment may be completed, and the insert attached, by manipulation from above the deck. Such an adaptation is shown, for example, in U.S. Pat. No. 5,628,171, by Stewart, et al., the disclosure of which is hereby incorporated by reference.

However, where plastic or other composite inserts are utilized, it may be difficult to fix a fastener, particularly a standard bolt, to the insert against rotation due to a lack of precision in molding processes, and potentially also due to a lack of rigidity or durability of the composite material which the insert is made from.

SUMMARY OF THE INVENTION

It is therefore an object of the invention to provide a fastener assembly to prevent rotation of threaded fastening members used to attach a mulch insert to the underside of mower decks.

It is a further object of the invention to provide such a fastener assembly that can withstand repeated installation and removal.

It is another object of the invention to provide such a fastener assembly that allows lateral adjustment to allow for misalignment of the insert with mounting holes in the mower deck.

It is yet another object of the invention to provide such an assembly that can accommodate a standard threaded fastener, such as a carriage bolt.

These and other objects are achieved by providing a composite insert for a mower deck that includes a fastener assembly secured against rotation within the insert. The fastener assembly includes a spacer that is non-rotatably received in recessed portion of the insert, and a fastening member which extends through the insert and is held against rotation by the spacer.

In a preferred embodiment a mulch insert has an elongated opening, allowing lateral movement of the fastening assembly to achieve alignment with mounting holes in the mower housing. A snap nut is used to prevent axial movement of the fastening assembly so that the fastening assembly and mulch insert become a unitary piece which may be positioned beneath the housing by an operator and secured in place from above the deck by a threaded member which engages the fastening member.

DESCRIPTION OF PREFERRED EMBODIMENT

Figure 1:
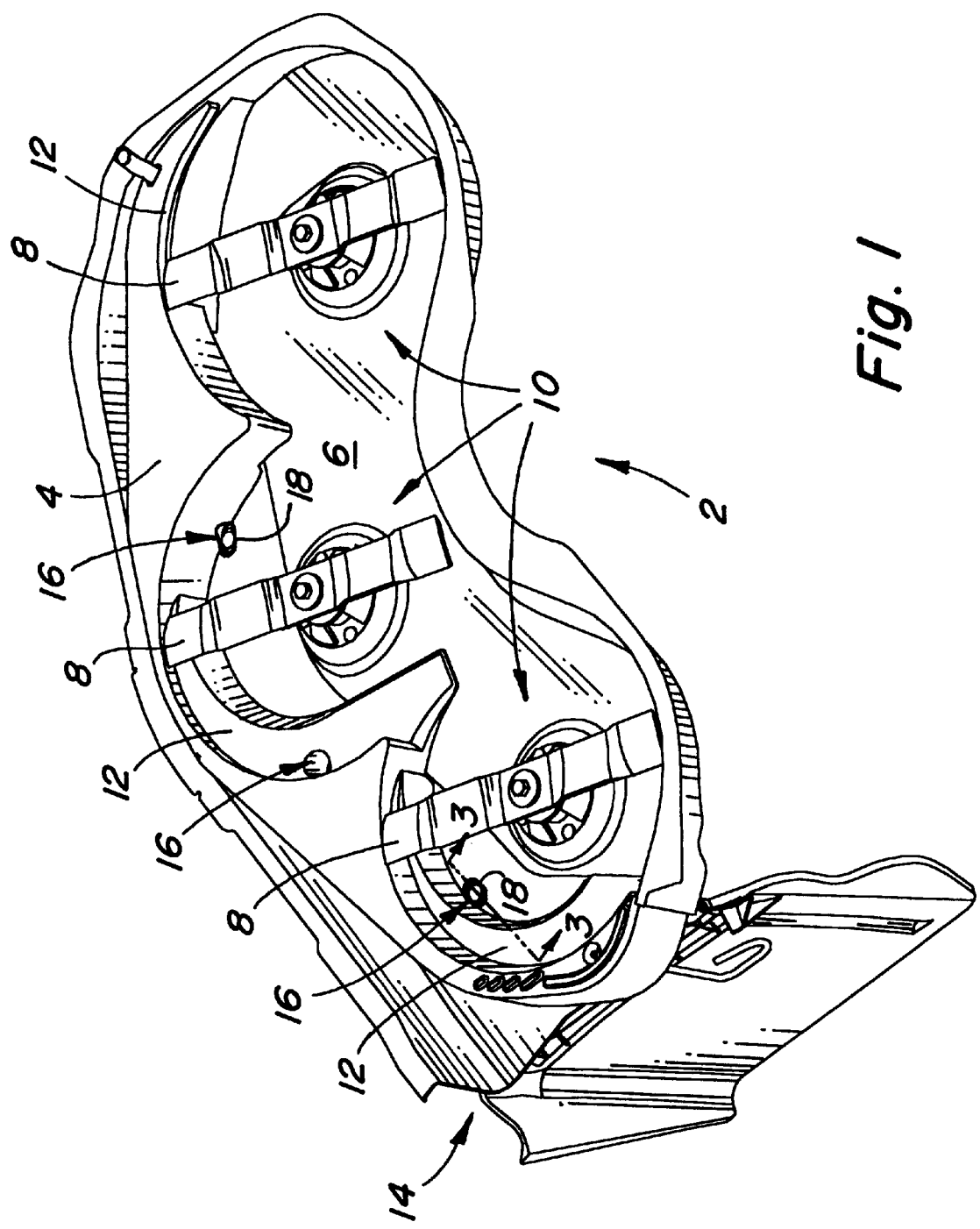
FIG. 1 is an underside perspective view of a mower deck fitted with a mulcher insert attached thereto by a fastening assembly according to the present invention.

FIG. 1 illustrates the underside of a mower deck 2 fitted with a mulch insert 4 according to the present invention. The deck 2 comprises a housing 6 that may be attached to a vehicle for cutting vegetation as the vehicle travels across the ground. Three blades 8 are suspended from the deck 2 and driven, for example, by a motor or motors so that they rotate in a generally horizontal plane.

The mulch insert 4 is positioned within a front portion of the housing 6 and helps define three generally circular cutting chambers 10 within which the blades 8 rotate and cut vegetation. The insert 4 defines arced front walls 12 that serve to form front walls of cutting chambers 10 of each blade 8 so that the insert 4 acts as baffle in each cutting chamber 10 to direct clippings back toward the blades 8 to be re-cut. The insert 4 also serves to block a discharge outlet 14 of the housing 6 such that the clippings cut by the blades 8 are confined within the housing 6 so that after they are re-cut or mulched by the blades 8 the clippings are then deposited onto the surface of the ground. The insert 4 extends across nearly the entire width of the mower housing 6 and is held in position by fastening assemblies 16 which include fastening members such as bolts 18.

Figure 2:
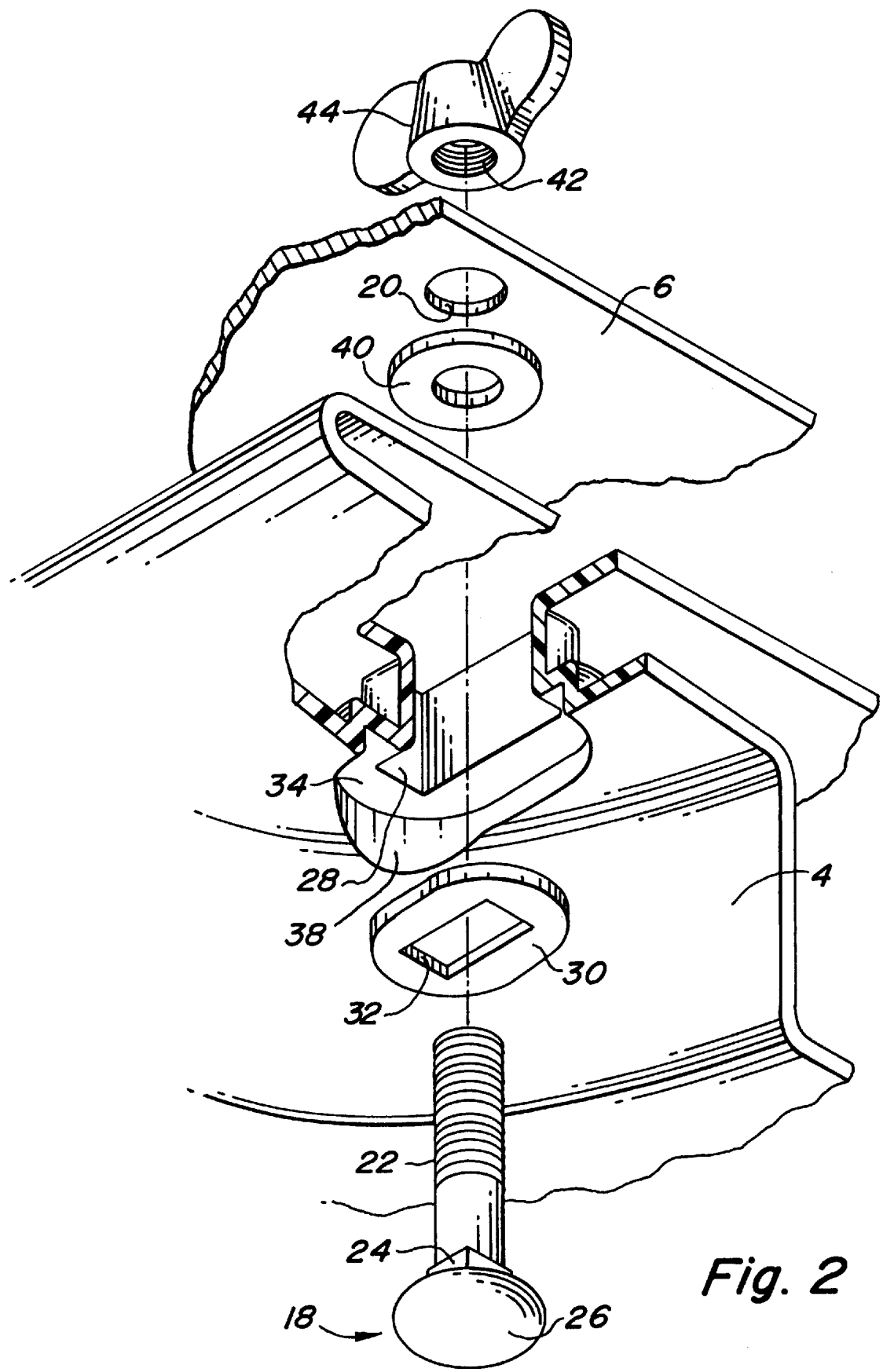
FIG. 2 is an exploded worm's-eye view of the mower deck of FIG. 1 particularly illustrating the fastener assembly for attaching the insert to the deck.

An exploded view of one of the fastening assemblies 16 is shown in FIG. 2. The mulch insert 4 is shown bolted to the housing 6 through a mounting hole 20. The bolt 18 shown is a standard carriage bolt having a shank with a threaded portion 22 and a square portion 24 adjacent a rounded head 26. The bolt 18 extends through an elongated rectangular opening 28 in the mulch insert 4. The elongation of the opening 28 in the preferred embodiment allows for lateral movement of the assembly 16 to overcome potential misalignment between the opening 28 and the mounting hole 20. An oblong washer 30 with a rectangular hole 32 captures the square portion 24 of the shank of the bolt 18 against relative rotation.

The washer 30 rests against a shoulder 34 inside an oblong recessed portion 36 molded into the mulch insert 4 and has a shape complementary to the shape of the washer 30 so that sides of the washer 30 engage sidewalls 38 of the recessed portion 36 to prevent rotation of the washer 30 with respect to the insert 4. In the preferred embodiment shown, the recessed portion 36 is slightly longer than the washer 30 so that the washer 30 may slide laterally within the recessed portion 36 and the bolt 18 within the hole 32 in the washer 30 during installation of the insert 4 to align the bolt with the mounting hole 20.

A retaining fastener 40 (push nut) is used to secure the bolt 18 and washer 30 in position so that the fastening assembly 16 and mulch insert 4 become a unitary piece. The retaining fastener 40 has an inside diameter, which is slightly smaller than the outside diameter of the shank of the bolt 18. The push action of applying the fastener 40 to the shank of the bolt 18 causes the fastener 40 to grip the bolt 18 and hold the fastener 40 in place, securing the fastener assembly 16 to the mulch insert 4 against axial movement while allowing the bolt 18 to move laterally within the opening 28 through the insert 4.

The unitary piece (comprising the fastener assembly 16 and the insert 4) may be positioned under the housing 6 so that the threaded portions 22 of the bolts extend through the mounting holes 20. Internal threads 42 of a wingnut 44 or other suitable threaded member engage the threaded portion 22 of the bolt 18 on the top side of the housing 6, securing the insert 4 in position within the housing 6. Any standard nut or other internally threaded member larger than the diameter of the mounting holes 20 may be substituted for the wingnut 22 herein described.

Figure 3:
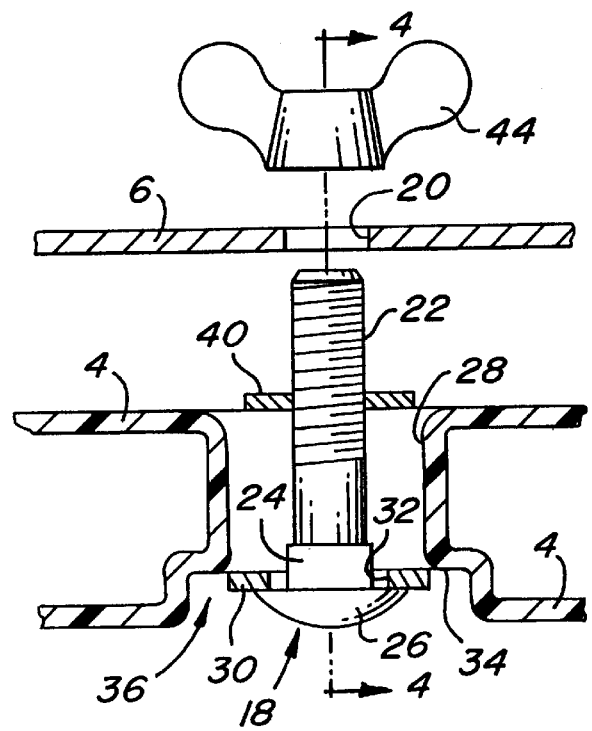
FIG. 3 is a cross-sectional view of the fastener assembly taken along line 3—3 of FIG. 1.

FIG. 3 is a cross-sectional view of the fastener assembly 16 taken along line 3—3 of FIG. 1. The length of the passage 28 is shown, illustrating the capability of the washer 30 to move side-to-side within the recessed portion 36 along the length of the passage 28 (to the left and right as shown in FIG. 3). At the same time, the hole 32 in the washer 30 is longer than the square portion 24 of the shank of the bolt 18 so that the bolt 18 may move laterally within the washer 30 along the length of the hole 32. This lateral adjustment allows an installer to make up for slight misalignment between the bolts 18 and the mounting holes 20 during installation of the insert 4 under the housing 6. Lateral adjustment may similarly be achieved by alternative configurations of the recessed portion 36 and the washer 30 shown. For instance, the hole 32 in the washer 30 could be made square to complement exactly the square portion 24 of the shank of the bolt 18, so that adjustment of the bolt 18 within the opening 28 through the insert 4 would be accomplished solely by the washer 30 sliding within the recessed portion 36 of the insert 4. As a further alternative, the washer 30 could be made to fit exactly within recessed portion 36 (so that sliding capability is eliminated) and the hole 32 in the washer 30 could be made the same length as opening 28 through insert 4.

Figure 4:
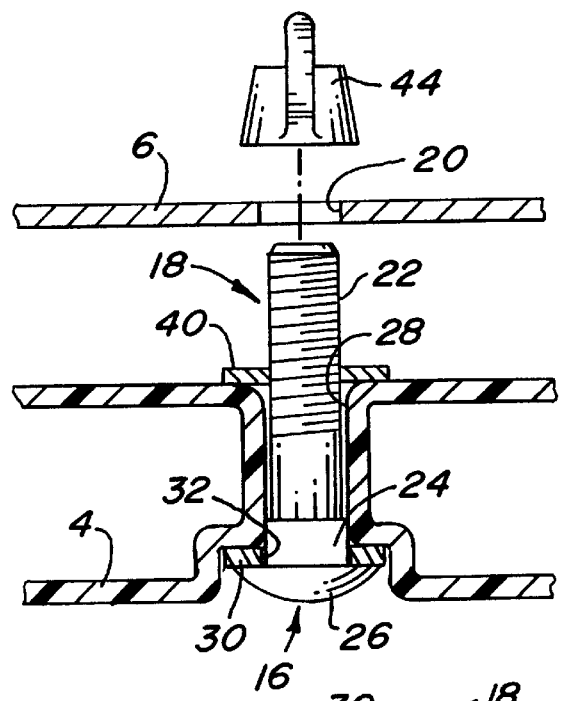
FIG. 4 is a cross-sectional view of the fastener assembly taken along line 4—4 of FIG. 3.

Referring now to FIG. 4, a second cross-sectional view of the fastening assembly is shown, taken along line 4—4 of FIG. 3 and showing the width of the opening 28. The width of the recessed portion 36 and the width of the opening 28 are only slightly greater than the corresponding dimensions of the washer 30 and bolt 18, respectively. The square portion 24 of the shank of the bolt is therefore held against rotation by sidewalls of the hole 32 in the washer 30, as well as substantial side-to-side movement to the left and right as seen in FIG. 4. In turn, the washer 30 is held against rotation and lateral movement to the left and right as viewed in FIG. 4 by sidewalls of the recessed portion 36.

Figure 5:
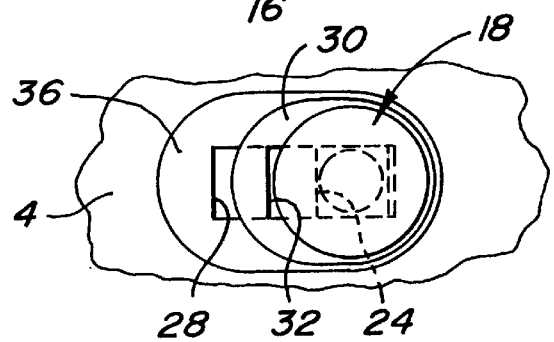
FIG. 5 is a fragmentary bottom view of the fastener assembly of FIGS. 3 and 4.

FIG. 5 is a bottom view of the fastener assembly 16 positioned within the recessed portion 36 of the insert 4, further illustrating the relationship between the square portion 24 of the shank of the bolt 18 and the hole 32 in the washer 30, as well as the relationship between the washer 30 and the recessed portion 36 of the insert 4. These relationships secure the bolt 18 against rotation relative to the insert 4 while allowing the bolt 18 to be moved side-to-side (left and right as viewed in FIG. 5) along the length of the opening 28 in the insert 4.

Although the invention is described with reference to illustrative embodiments for use with a mulch insert, it will be understood by those skilled in the art that the invention may be advantageous in the form described or as modified for use in other applications wherein it is desirable to attach an insert beneath a mower housing. The present invention should not be limited by the above-described embodiments, but should be limited solely by the claims that follow.

We claim:

1. A composite insert assembly for attachment to a mower deck, said assembly comprising:

a composite insert having an opening extending therethrough and a recessed portion adjacent the opening, said recessed portion having a shoulder and a first abutment surface;

a spacer receivable in the recessed portion adjacent the shoulder, said spacer having a passage therethrough alignable with the opening in the insert, the passage having a second abutment surface, said spacer also having an outer periphery, a portion of said periphery forming a third abutment surface alignable with the first abutment surface for non-rotatable engagement therewith; and a fastening member having a head and a shank, the shank including a threaded portion and a further portion adjacent to the head, said further portion having a fourth abutment surface engagable with the second abutment surface; and a threaded member engagable with the threaded portion of the fastening member for securing the insert to the mower deck;

said spacer configured as an oblong washer having two generally parallel flat sides which comprise the second abutment surface.

2. The assembly of claim 1 wherein the fastening member is a carriage bolt whose shank includes a square portion and the passage through the washer is generally square.

3. The assembly of claim 1 wherein the recessed portion is longer than the spacer.

4. A composite insert assembly for attachment to a mower deck, said assembly comprising:

a composite insert having an opening extending therethrough configured as an elongated slot and a recessed portion adjacent the opening, said recessed portion having a shoulder and a first abutment surface;

a spacer receivable in the recessed portion adjacent the shoulder, said spacer having a passage therethrough alignable with the opening in the insert, the passage having a second abutment surface, said spacer also having an outer periphery, a portion of said periphery forming a third abutment surface alignable with the first abutment surface for non-rotatable engagement therewith; and a fastening member having a head and a shank, the shank including a threaded portion and a further portion adjacent to the head, said further portion having a fourth abutment surface engagable with the second abutment surface; and a threaded member engageable with the threaded portion of the fastening member for securing the insert to the mower deck.

5. A composite insert assembly for attachment to a mower deck, said assembly comprising:

a composite insert having an opening extending therethrough and a recessed portion adjacent the opening, said recessed portion having a shoulder and a first abutment surface;

a spacer receivable in the recessed portion adjacent the shoulder, said spacer having a passage therethrough alignable with the opening in the insert, the passage having a second abutment surface, said spacer also having an outer periphery, a portion of said periphery forming a third abutment surface alignable with the first abutment surface for non-rotatable engagement therewith;

a fastening member having a head and a shank, the shank including a threaded portion and a further portion adjacent to the head, said further portion having a fourth abutment surface engagable with the second abutment surface whereby the fastening member is non-rotatably receivable within the spacer passage and the insert opening; and a retainer engagable with the threaded portion of the fastening member at a side of the insert opposite the recessed portion attaching the fastening member and the spacer to the insert, forming a unitary piece;

said recessed portion being formed longer than the spacer.

6. A composite insert assembly for attachment to a mower deck, said assembly comprising:

a composite insert having an opening extending therethrouqh and a recessed portion adjacent the opening, said recessed portion having a shoulder and a first abutment surface;

a spacer receivable in the recessed portion adjacent the shoulder, said spacer having a passage therethrough alienable with the opening in the insert, the passage having a second abutment surface, said spacer also having an outer periphery, a portion of said periphery forming a third abutment surface alignable with the first abutment surface for non-rotatable engagement therewith;

a fastening member having a head and a shank, the shank including a threaded portion and a further portion adjacent to the head, said further portion having a fourth abutment surface engagable with the second abutment surface whereby the fastening member is non-rotatably receivable within the spacer passage and the insert opening; and a retainer engagable with the threaded portion of the fastening member at a side of the insert opposite the recessed portion attaching the fastening member and the spacer to the insert, forming a unitary piece;

said passage in the spacer being is longer than the further portion of the shank of the fastening member.

7. A composite mulch insert assembly for attachment to a mower deck, said assembly comprising:

a mulch insert having a recessed portion including a shoulder and an opening extending therefrom through the mulch insert, said recessed portion having a non-circular shape;

a washer having a noncircular shape complementary to the noncircular shape of the recessed portion of the mulch insert and having a noncircular passage therethrough in alignment with the opening through the mulch insert, said washer non-rotatably received in the recessed portion of the mulch insert;

a bolt having a head and a shank, the shank of the bolt including a threaded portion and a further portion adjacent to the head, said further portion having a noncircular cross-section complementary to the noncircular passage of the washer, said further portion of the bolt non-rotatably received in the passage;

said bolt received in the opening through the mulch insert operatively fixed against axial movement relative thereto; and said recessed portion being formed longer than the spacer.

8. A composite mulch insert assembly for attachment to a mower deck, said assembly comprising:

a mulch insert having a recessed portion including a shoulder and an opening extending therefrom through the mulch insert, said recessed portion having a non-circular shape;

a washer having a noncircular shape complementary to the noncircular shape of the recessed portion of the mulch insert and having a noncircular passage therethrough in alignment with the opening through the mulch insert, said washer non-rotatably received in the recessed portion of the mulch insert;

a bolt having a head and a shank, the shank of the bolt including a threaded portion and a further portion adjacent to the head, said further portion having a noncircular cross-section complementary to the noncircular passage of the washer, said further portion of the bolt non-rotatably received in the passage;

said bolt received in the opening through the mulch insert operatively fixed against axial movement relative thereto; and said passage in the spacer being longer than the further portion of the shank of the bolt.

* * * * *